(12) United States Patent
Yun et al.

(10) Patent No.: US 8,165,227 B2
(45) Date of Patent: Apr. 24, 2012

(54) METHOD OF KEYING FOR BROADCAST USING OFDM

(75) Inventors: Youn Woo Yun, Seoul (KR); Ki Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 11/576,874

(22) PCT Filed: Oct. 25, 2005

(86) PCT No.: PCT/KR2005/003556
§ 371 (c)(1),
(2), (4) Date: Mar. 7, 2008

(87) PCT Pub. No.: WO2006/046825
PCT Pub. Date: May 4, 2006

(65) Prior Publication Data
US 2009/0003465 A1    Jan. 1, 2009

(30) Foreign Application Priority Data

Oct. 25, 2004   (KR) .................... 10-2004-0085291

(51) Int. Cl.
*H04L 27/28* (2006.01)
(52) U.S. Cl. ......... 375/260; 375/267; 375/301; 375/244
(58) Field of Classification Search .................. 375/260, 375/300; 370/203, 204, 206, 208, 210
See application file for complete search history.

(56) References Cited

U.S. PATENT DOCUMENTS

| | | | |
|---|---|---|---|
| 6,445,746 B1 | 9/2002 | Kim et al. | |
| 6,882,618 B1 * | 4/2005 | Sakoda et al. | 370/208 |
| 6,944,122 B2 * | 9/2005 | Shirakata et al. | 370/208 |
| 7,480,339 B2 * | 1/2009 | Hwang et al. | 375/267 |
| 7,606,196 B2 * | 10/2009 | Maeda et al. | 370/330 |
| 7,830,970 B2 * | 11/2010 | De Bart et al. | 375/260 |

FOREIGN PATENT DOCUMENTS

KR    1999-0087757    12/1999

OTHER PUBLICATIONS

Bohnke, R.; Suzuki, M.; Sakoda, K.; Spectral Efficient Modulation schemes in a SFH_TDMA Orthogonal Frequency Division Multiplexing (OFDM) Wireless Communiation System to Support Advanced Services.: In: 48th IEE Vehicular Technology Conference, 1998. VTC 98. vol. 3, May 18-21, 1998. Der-Zheng Liu; Che-Ho Wei; "Channel Extimation and Compensation for Preamble-Assisted DAPSK Transmission in Digital Mobile Radio System." In: IEEE Transactions on Vehicular Technology, vol. 50, Issue 2, Mar. 2001.
H. Rohling et al., "Differential Amplitude Phase Shift Keying (DAPSK)—A New Modulation Method for DTVB," International Broadcasting Convention, Conference Publication No. 413, pp. 102-108, Sep. 1995.

\* cited by examiner

*Primary Examiner* — Dhaval Patel
(74) *Attorney, Agent, or Firm* — Lee, Hong, Degerman, Kang & Waimey

(57) ABSTRACT

A method of modulation, which is applied to a communication system transmitting data in one frequency band using at least two orthogonal subcarriers, is disclosed. The present invention includes the steps of adding information bits indicating an amplitude reference and a phase reference to an input bit sequence by a specific time interval unit and carrying out differential amplitude phase shift keying (DAPSK) on the input bit sequence using the amplitude and phase references. The present invention prevents the waste of power and bandwidth due to insertion of a plurality of pilot toes in the related art 1β-QAM system.

1 Claim, 5 Drawing Sheets prior-art prior-art

METHOD OF KEYING FOR BROADCAST USING OFDM

CROSS-REFERENCE TO RELATED APPLICATIONS

This application is a 371 U.S. national stage application of International Application No. PCT/KR2005/003556, filed on Oct. 25, 2005, which claims the benefit of earlier filing date and right of priority to Korean Patent Application No. 10-2004-0085291, filed on Oct. 25, 2004.

TECHNICAL FIELD

The present invention relates to a data demodulating method applied to orthogonal frequency division multiplexing (OFDM), and more particularly, to a method of performing differential phase amplitude transition modulation in case of performing a broadcast by OFDM.

BACKGROUND ART

FIG. 1 is a diagram of an interlace structure according to a related art. Referring to FIG. 1, a 1xEV-DO broadcast system according to a related art designates a specific interlace as a broadcast slot on an interlace structure and enables broadcasting information to be transmitted using the slot.

Meanwhile, if orthogonal frequency division multiplexing (hereinafter abbreviated OFDM) is applied to the specific interlace, transmission capacity can be raised higher than that of the conventional code division multiple access (hereinafter abbreviated CDMA).

Due to the characteristics of the broadcast system, all base stations transmit the same signals, respectively. In case of using OFDM and a cyclic prefix having a suitable length, it is advantageous in that multi-path signals received within a corresponding delay duration interval defined by the cyclic prefix do not degrade the reception performance of a mobile station.

Namely, if a cyclic prefix enough to overcome a delay spread on a cell boundary is used, mobile stations around the cell boundary may regard a signal transmitted from a different base station as a multi-path signal only. Hence, a broadcast quality can be provided to the mobile stations on the cell boundary.

A currently proposed OFDM broadcast system is to transmit OFDM symbols carried by a data part of the broadcast slot shown in FIG. 1. By adopting the OFDM transmission system, a high broadcast data rate can be enabled. For example of the broadcast by OFDM, six data rates of 1.8 Mbps~409.6 kbps, as shown in Table 1, can be supported by the combination of two payload sized (3072, 2048) and three slot lengths (1-slot, 2-slot, 3-slot).

TABLE 1

| 1st data rate set | | 2nd data rate set | |
|---|---|---|---|
| Data rate (kbps) | Number of slot | Data rate (kbps) | Number of slot |
| 1843.2 | 1 | 1228.8 | 1 |
| 921.6 | 2 | 614.4 | 2 |
| 614.4 | 3 | 409.6 | 3 |

Four data intervals, as shown in FIG. 1, exist in one interlace slot interval. Each of the data intervals includes 400 chips. If an OFDM block includes the 400 chips, two hundred forty 16-QAM (quadrature amplitude modulation) data symbols are transmitted via one OFDM block. Hence, 960 (240*4) encoded symbols are carried in one OFDM block.

FIG. 2 is a block diagram of a transmission chain for an OFDM broadcast system according to a related art. Referring to FIG. 2, data inputted to a turbo encoder 21 is encoded at ⅕ coding rate. The encoded data is scrambled by a scrambler 22.

The scrambled data goes through channel interleaving and 16-QAM processes 23 and 24 so that two hundred forty 16-QAM modulated data symbols are transmitted via one OFDM block. And, twenty guard tones are inserted in the OFDM block through cyclic shift-reordering and truncation processes 25 and 26 to prevent an aliasing effect. A pilot tone is then inserted, because it is necessary to estimate amplitude and phase information of a channel which varies according to time and subcarriers, for using the 16-QAM system.

For instance, one pilot tone can be inserted in each four data tones. In this case, total sixty-four pilot tones are inserted in one OFDM block. Where, the pilot tone inserted for twenty guard tone intervals replaces the guard tone. Hence, total three hundred twenty tones (=240 data tones+64 pilot tones+20 guard tones−4) are obtained. For this, an OFDM signal is generated using 320-dimensional IFFT (Inverse Fast Fourier Transform).

And, the remaining eighty chip intervals are used as a cyclic prefix. The cyclic prefix is inserted to remove neighbor symbol interference and neighbor subcarrier channel interference. According to a length of the intervals, a maximum delay spread value to keep the OFDM transmission may be decided.

Table 2 shows an example of a symbol configuration of an OFDM block according to a related art.

TABLE 2

| Cyclic prefix length | 80 |
|---|---|
| Number of Pilot tone | 64 |
| Number of Data tone | 240 |
| Number of Guard tone | 20 |
| Total number of tones in one OFDM block | 320 |

The currently proposed 1xEV-DO OFDM broadcast system adopts 16-QAM as a modulation method. As the 16-QAM transmits data using phase information and amplitude information together, its performance is greatly affected by phase and size variations of a channel. Hence, for the demodulation from the 16-QAM, the phase and size variations of the channel need to be estimated.

In the related art, pilot tones are inserted with each uniform interval for the channel estimation. In particular, one pilot tone is inserted each four data tones. However, additional power or bandwidth caused by the insertion of the pilot tones degrades the advantages in using the coherent 16-QAM.

Besides, due to the characteristics of OFDM, channel estimation according to time needs to be carried out for each three hundred twenty subcarriers. Accordingly, the channel estimation has to be carried out by considering frequency and time axes together. Hence, complexity pf a mobile station is raised.

DISCLOSURE OF THE INVENTION

To achieve these and other advantages and in accordance with the purpose of the present invention, in a communication system transmitting data in one frequency band using at least two orthogonal subcarriers, a method of modulation according to the present invention includes the steps of adding information bits indicating an amplitude reference and a phase reference to an input bit sequence by a specific time interval unit and carrying out differential amplitude phase shift keying (DAPSK) on the input bit sequence using the amplitude and phase references.

In this case, symbols differentially modulated using the amplitude and phase references are re-ordered so that the symbols can be transmitted via a subcarrier of a mutually adjacent frequency.

Preferably, subcarriers not transmitting the data are located at both ends of the frequency band in a frequency domain. And, the specific time interval unit is an orthogonal frequency division multiplexing (OFDM) block.

A method of modulation, which is applied to a broadcast using orthogonal frequency division multiplexing (OFDM), includes the steps of inserting one pilot tone in each orthogonal frequency division multiplexing block and carrying out differential amplitude phase shift keying (DAPSK) by taking the pilot tone as a reference.

In this case, guard tones not transmitting specific data may be inserted in both ends of a band carrying out the broadcast in a frequency domain.

BEST MODE FOR CARRYING OUT THE INVENTION

The aforesaid objectives, features and advantages of the invention will be set forth in the description which follows, and in part will be apparent from the description. Reference will now be made in detail to one preferred embodiment of the present invention, examples of which are illustrated in the accompanying drawings.

First of all, the present invention proposes an OFDM broadcast method of 1xEV-DO employing differential modulation to solve the aforesaid 16-QAM channel estimation problem and an overhead increasing problem.

Figure 3:
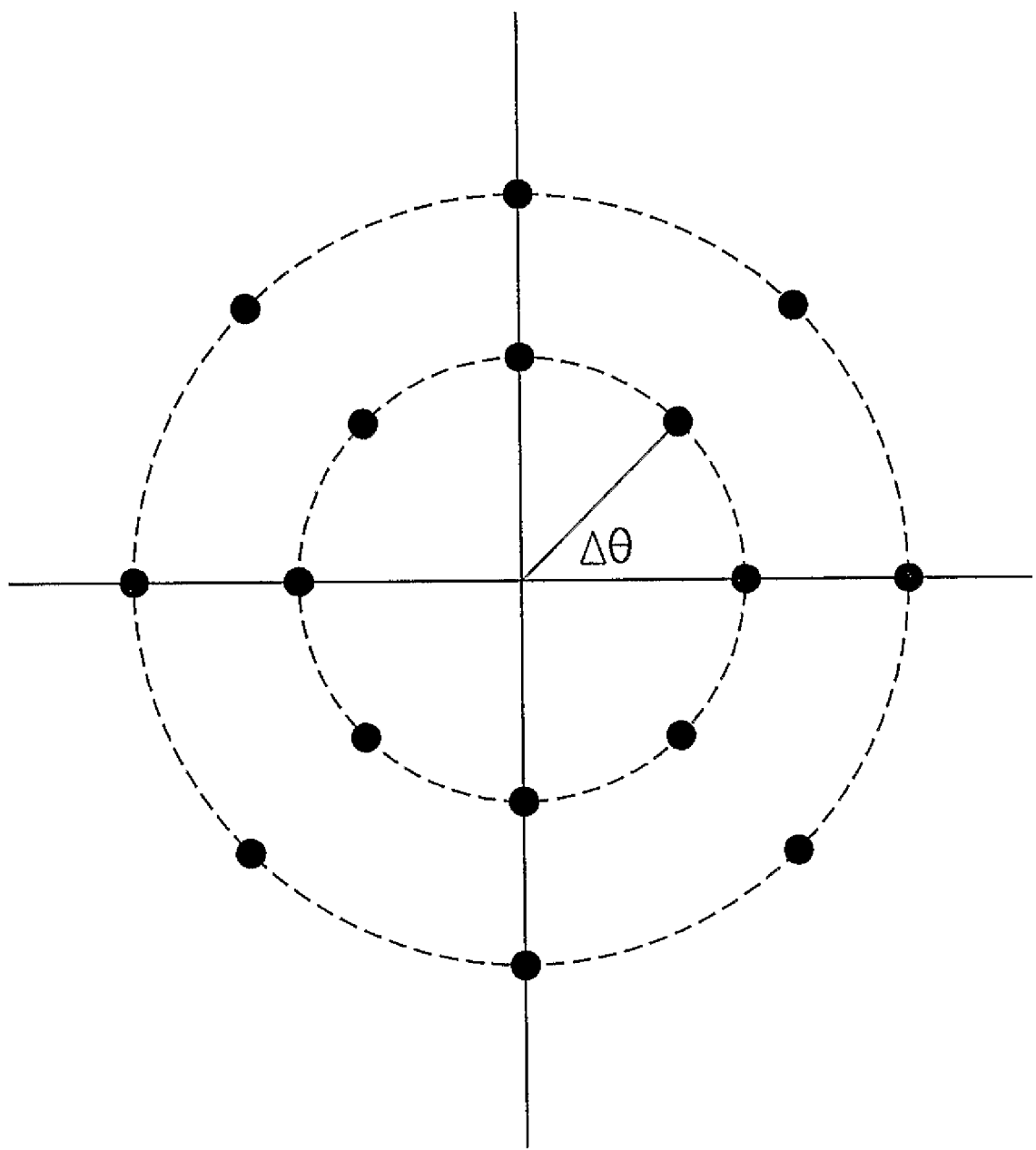
FIG. 3 is a diagram for explaining 16-ray DAPSK (differential amplitude phase shift keying)

FIG. 3 is a diagram for explaining 16-ary DAPSK (differential amplitude phase shift keying). In the present invention, 16-ary DAPSK is employed to support the same bandwidth efficiency and data rate of the conventional system. The 16-ary DAPSK applies differential encoding to amplitude information and phase information of a modulation symbol.

In the 16-ary DPASK, bits inputted to a modulator are grouped into 4-bit units to be mapped to one 16-ary DAPSK modulation symbol. In this case, one of four inputted bits is used as a bit for indicating a size and the rest three bits are used as bits for indicating a phase.

Hence, a constellation, as shown in FIG. 3, can be configured to have eight phases and two amplitudes. Namely, if bits of an $n^{th}$ symbol are represented as $a_{1n}$, $a_{2n}$, $a_{3n}$ and $a_{4n}$, respectively, an amplitude of a modulated signal is determined according to $a_{1n}$. And, a phase of the modulated signal is determined using values of $a_{2n}$, $a_{3n}$ and $a_{4n}$. To determine the amplitude and phase using values of $a_{1n}$, $a_{2n}$, $a_{3n}$ and $a_{4n}$, a current input bit value is used based on amplitude and phase values of a previous modulation symbol.

In the following description, a method of determining an amplitude and a phase using the bits of the $n^{th}$ symbol is explained. First of all, a differential encoding method for an amplitude can be expressed as Formula 1.

$A_n = A_{n-1}$, if $a_{1n}=0$ $A_n \neq A_{n-1}$, if $a_{1n}=1$ [Formula 1]

In Formula 1, $A_n$ indicates an amplitude value of an $n^{th}$ modulation symbol. As can be seen through Formula 1, an amplitude value of a current modulation symbol can be differentially calculated using a 1-bit $a_{1n}$ value and an amplitude value of a previous symbol.

A differential encoding method for a phase can be expressed as Formula 2.

$\theta = (\theta_{n-1} + (m\Delta\theta)) \mod 360°$ [Formula 2]

Figure 1:
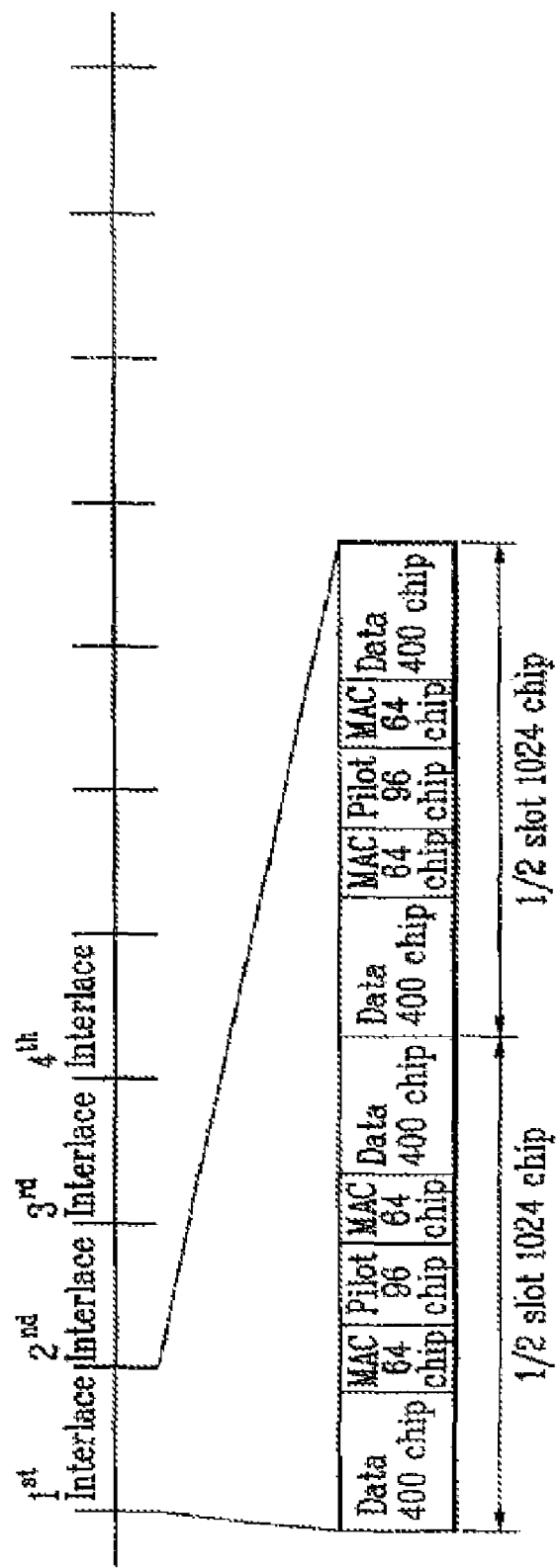
FIG. 1 is a diagram of an interlace structure according to a related art.
Figure 2:
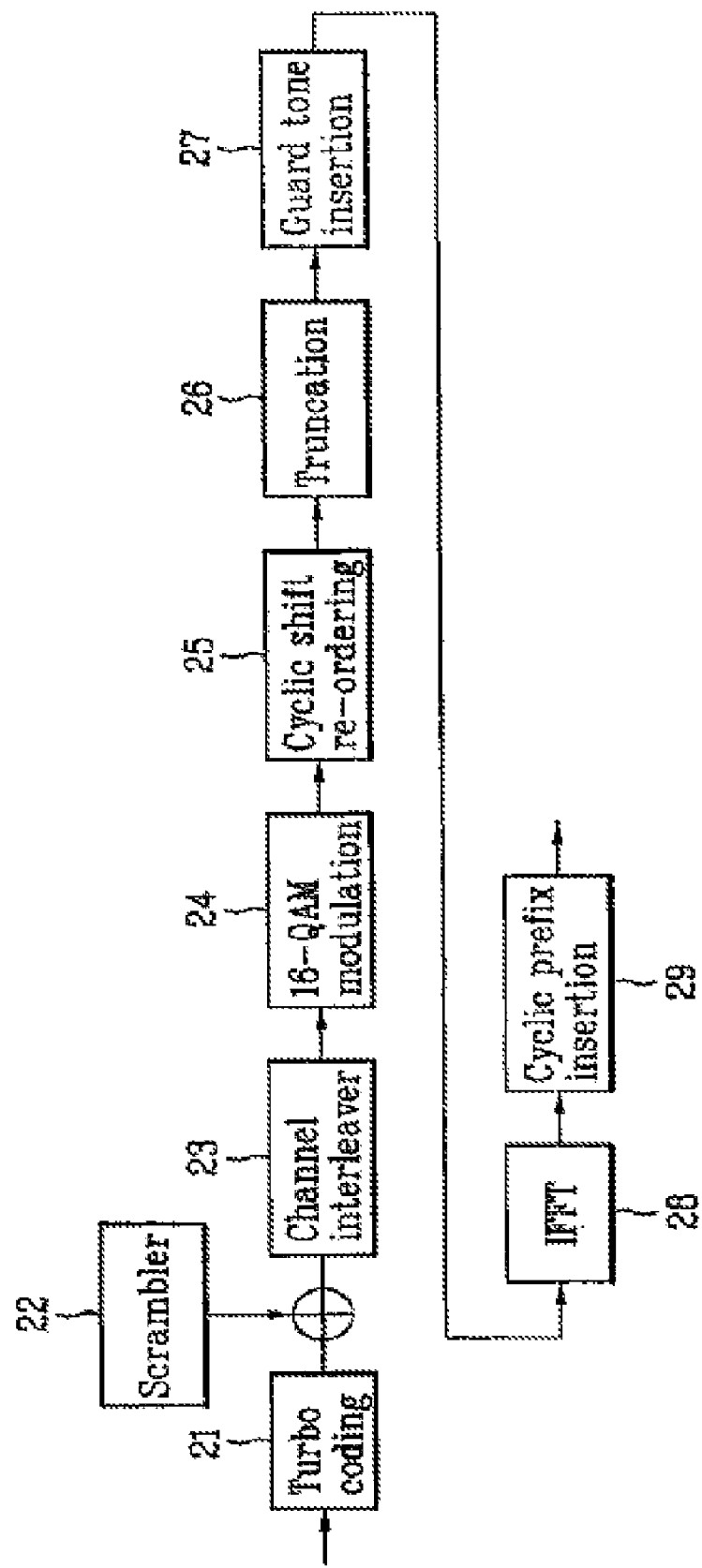
FIG. 2 is a block diagram of a transmission chain for an orthogonal frequency division multiplexing (hereinafter abbreviated OFDM) broadcast system according to a related art.

In Formula 2, a value of '$\theta_n$' indicates a phase value of the $n^{th}$ modulation symbol. '$\Delta\theta$' is a difference between neighbor phases in constellation and indicates $360/8=45°$. 'm' is a denary value determined by ($a_{2n}$, $a_{3n}$, $a_{4n}$) and has a value of 0~7. Namely, if ($a_{2n}$, $a_{3n}$, $a_{4n}$) is (000), 'm' has a value of 0. If ($a_{2n}$, $a_{3n}$, $a_{4n}$) is (111), 'm' has a value of 7. The phase value of the $n^{th}$ modulation symbol, as shown in FIG. 2, is determined by a phase value of an $(n-1)^{th}$ modulation symbol and a current input bit ($a_{2n}$, $a_{3n}$, $a_{4n}$).

If the modulated signal is configured in the above-explained manner, absolute variations of the phase and amplitude occurring in a time-variable channel need not to be measured. If a receiving end decides that a channel value of the previous modulation symbol and a channel value of the current modulation symbol are close to each other, the previous modulation symbol can be used as a reference value in a demodulation process for the current modulation symbol.

To apply the 16-ary DAPSK modulation to the 1xEV-DO OFDM broadcast system, a method of performing differential modulation on symbols between neighbor subcarrier frequencies within one OFDM block is taken into consideration.

Figure 4:
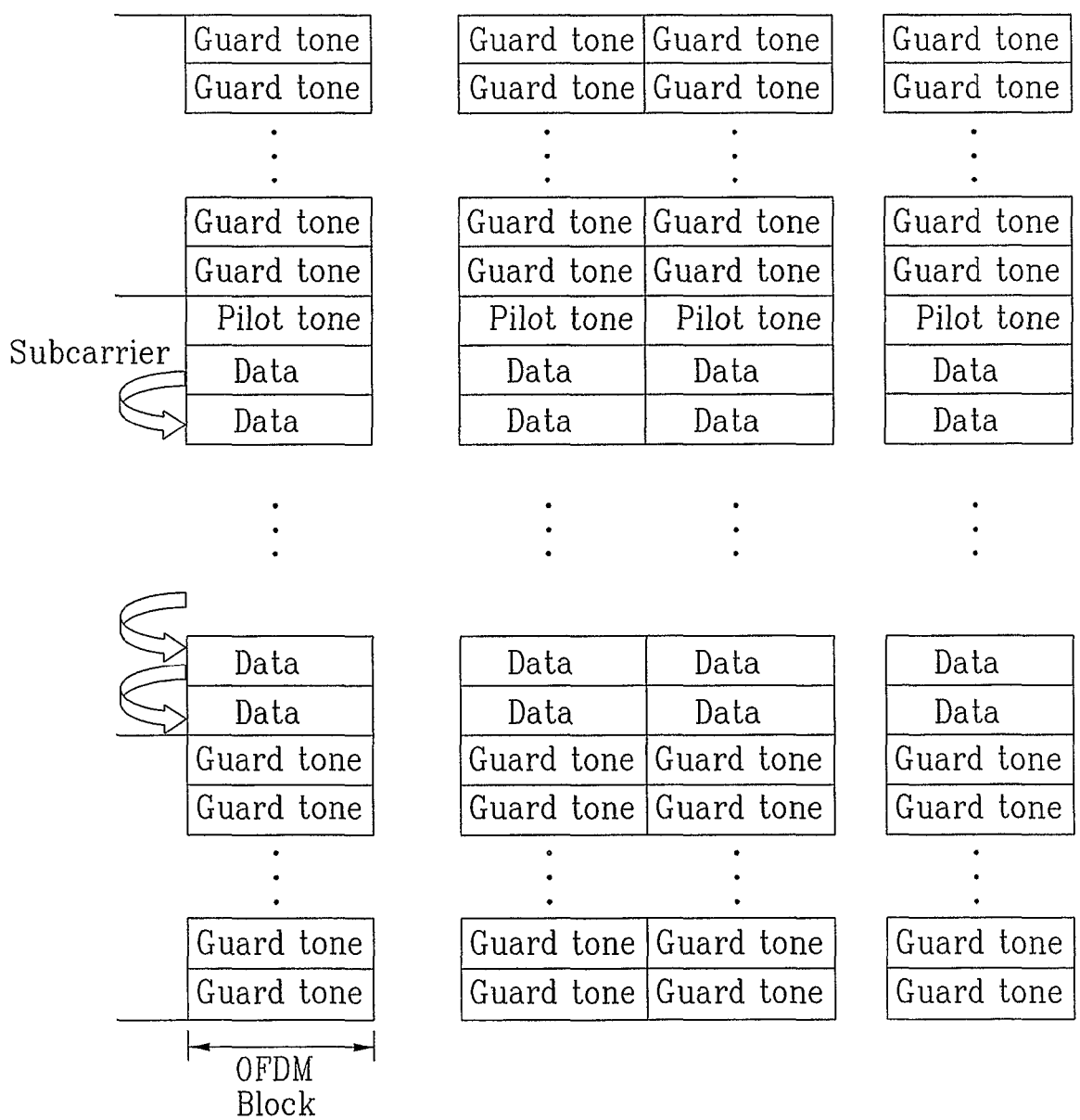
FIG. 4 is a diagram of an OFDM block configuration according to one embodiment of the present invention.

FIG. 4 is a diagram of an OFDM block configuration according to one embodiment of the present invention. Referring to FIG. 4, pilot tones should be inserted in a position corresponding to a first subcarrier except guard tones in each OFDM block. This is necessary to set up an initial reference value of differential modulation. In the related art, sixty-four pilot tones are inserted in each OFDM block. But, just one pilot tone is necessary to be inserted in each OFDM block as an initial reference value of differential modulation in the present invention. Hence, bandwidths and power having been occupied by the pilot tones can be allocated to an encoded data symbol instead of the pilot tones. Namely, the present invention can use a coding rate lower than that used in the case of using 16-QAM. Since a mobile station can skip the channel estimation process carried out in the time and frequency domains, complexity can be reduced.

Table 3 shows a symbol configuration of an OFDM block according to the present invention.

TABLE 3

| | |
|---|---|
| Cyclic prefix length | 80 |
| Pilot tone No. | 1 |
| Data tone No. | 299 |
| Guard tone No. | 20 |
| Total tone No. in one OFDM block | 320 |

Referring to Table 3, one OFDM block can comprise two hundred ninety-nine data tones, one pilot tone and twenty guard tones.

Consequently, comparing with the related art OFDM block configuration shown in Table 2 to the OFDM block configuration according to the present invention (Table 3), the case of using 16-ary DAPSK can transmit fifty-nine modulation symbols per OFDM block more than the case of using 16-QAM.

Table 4 is a result of comparing coding rates of the present invention and the related art.

TABLE 4

| Payload size | Slot No. | Data rate (kbps) | Valid coding rate in the related art | Valid coding rate according to the present invention |
|---|---|---|---|---|
| 3072 | 1 | 1843.2 | 0.8 | 0.642 |
| 2048 | 1 | 1228.8 | 0.533 | 0.428 |
| 3072 | 2 | 921.6 | 0.4 | 0.321 |
| 2048 | 2 | 614.4 | 0.266 | 0.214 |
| 3072 | 3 | 614.4 | 0.2 | 0.2 |
| 2048 | 3 | 409.6 | 0.2 | 0.2 |

Referring to Table 4, at the same data rate, the case of using 16-ary DAPSK has a lower coding rate.

Figure 5:
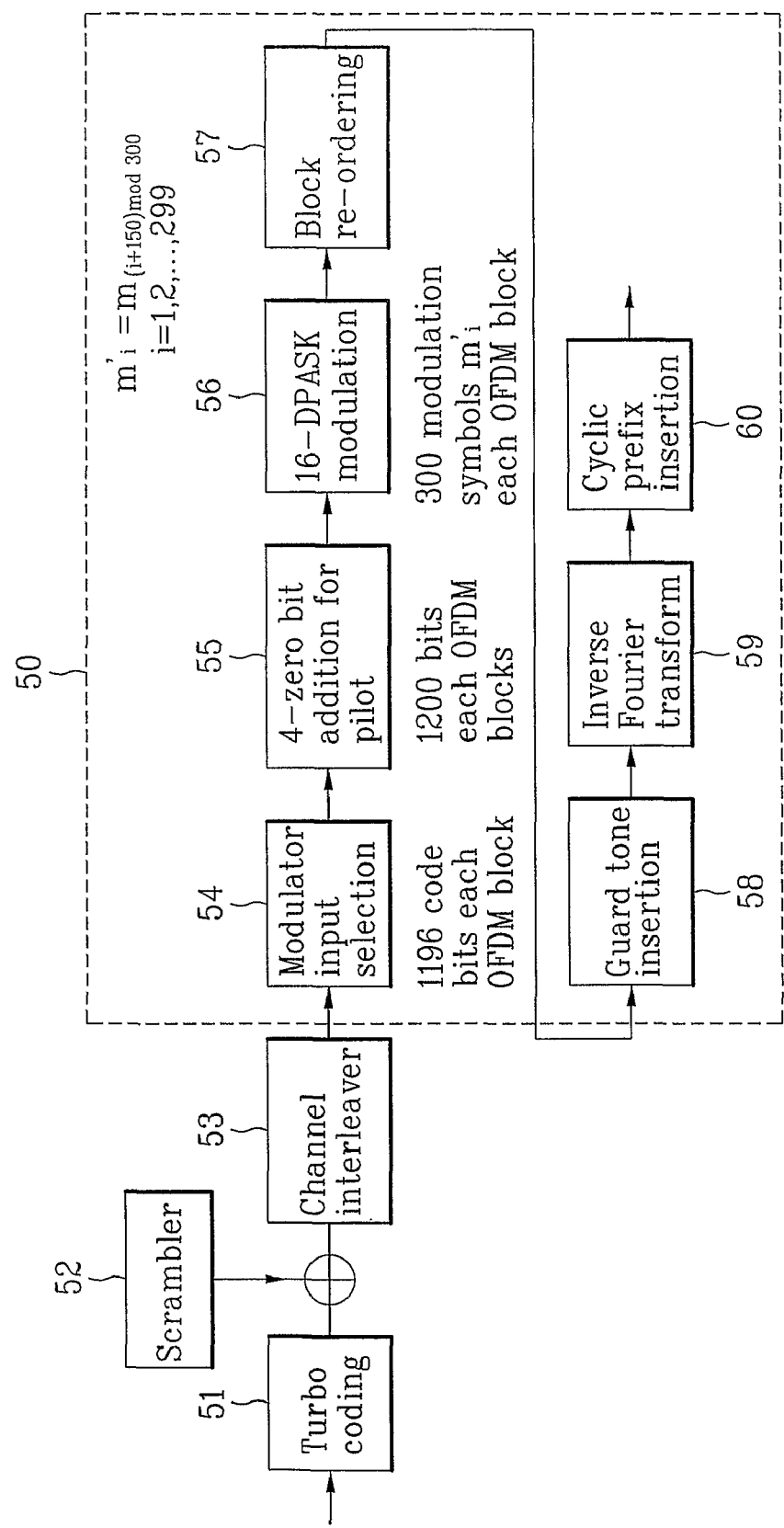
FIG. 5 is a block diagram of a transmission chain for an OFDM broadcast system according to one embodiment of the present invention.

FIG. 5 is a block diagram of a transmission chain for an OFDM broadcast system according to one embodiment of the present invention. Referring to FIG. 5, turbo coding at ⅕ coding rate is carried out on input data (51). Channel interleaving is then carried out on an encoded bit sequence (53). The encoded interleaved bit sequence is inputted to a differential encoder by 299*4 unit (unit of one OFDM block) (54).

A part 50 enclosed by a dotted line indicates an operation of OFDM block unit. In particular, a differential encoding process is carried out on 299*4 encoded bits in a first OFDM block. In a next OFDM block, a differential encoding process is carried out on another 299*4 encoded bits following the encoded bit processed in the first OFDM block. And, such a process is repeatedly carried out on the entire OFDM blocks within one interlace.

If a transmission format has a 2-slot length, the differential modulation by the OFDM block unit is repeatedly carried out on eight OFDM blocks during two slots. If a transmission format has a 3-slot length, the differential modulation by the OFDM block unit is repeatedly carried out on twelve OFDM blocks during three slots. In case that data more than a length of a ⅕-encoded data sequence needs to be modulated (e.g., encoded bits inputted to a modulator in $11^{th}$ and $12^{th}$ OFDM blocks in a transmission format having a 3072 payload size and a 3-slot length), repetitive values for an output encoded sequence of a ⅕ encoder are used as inputs.

In this case, it is assumed that an initial phase value and an amplitude value of a 16-DAPSK modulator in each OFDM block is a previously agreed prescribed modulation symbol, which is named a pilot symbol. In the present invention, it is assumed that a modulation symbol defined by a phase of 0 and a small amplitude is an initial symbol. For this, four zero bits are added to a front end of an input block of a 16-ary DPASK modulator. Hence, a 1,200-bit input sequence will be inputted to the modulator and three hundred output modulation symbols can be obtained.

In order for neighbor differential-modulation symbols, in a subcarrier domain, to be carried over a neighbor subcarrier frequency, a modulation symbol re-ordering block 57 is necessary. The modulation symbol re-ordering block 57 carries out the following operation. If modulation symbols inputted to the modulation symbol re-ordering block 57 are represented as $m_i$ (i=0, 1, 2, . . . , 298, 299), an output symbol $m_i'$ is expressed as Formula 3.

$$m_i' = m_{i\ (i+150)\ mod\ 300}, \text{where } i=0, 1, 2, \ldots, 298, 299) \quad \text{[Formula 3]}$$

After completion of the modulation symbol re-ordering, twenty guard tones are inserted (58). Wherein, the guard tones may be arranged to both ends of a band in a frequency domain. Hence, the guard tones have to be inserted in the middle of the output symbols of the modulation symbol re-ordering block 57. In particular, in case that three hundred output symbols of the modulation symbol re-ordering block are sequentially arranged in a row, twenty guard tones are inserted ahead of a $150^{th}$ output symbol.

Through the above-explained process, one OFDM block can have the form shown in FIG. 4. Namely, one OFDM block includes three hundred twenty subcarriers. And, the guard tones are arranged to first ten subcarriers among the three hundred twenty subcarriers. Subsequently, a pilot tone having initial reference phase information and amplitude information to be used in differential demodulation of DPASK is placed. Finally, two hundred ninety-nine 16-DPASK modulation symbols are arranged to the corresponding subcarriers, respectively. In this case, neighbor differential modulation symbols are placed in a neighbor subcarrier area.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to keying of a mobile communication system that employs OFDM.

What is claimed is:
1. A method for transmission in a communication system, the method comprising:
   encoding input bits at a certain rate;
   interleaving the encoded bits;
   inputting the interleaved encoded bits into an Orthogonal Frequency Division Multiplexing (OFDM) block generation unit,
   wherein the encoded bits are grouped into m-bits wherein m is greater than 2 and mapped to a differential amplitude phase shift keying (DAPSK) modulation symbol, wherein a first bit of an m-bit unit is used as an amplitude reference, while the rest of the bits of the m-bit unit other than the first bit are used as a phase reference,
   wherein values of the amplitude reference and the phase reference are generated using a differential modulation method of which previous symbols are used as an amplitude reference and a phase reference for a current symbol;
   inserting pilot bits into code bits of each OFDM block, wherein the pilot bits have a specific phase and a specific amplitude to be used as initial reference information to be used in a differential demodulation of DAPSK;
   applying the DAPSK modulation symbol to generate modulation symbols in each OFDM block;
   re-ordering the generated modulations symbols in each OFDM block to carry out neighboring differential modulation symbols over a neighboring subcarrier frequency, wherein an output of the modulation symbol re-ordering is defined as:

$m_i' = m_{i\ (i+N)\ mod\ 2N}$, where i=0, 1, 2, ..., 2N−1, wherein mi is represented as an input to the re-ordering block and mi' is an output of the re-ordering block;

inserting guard tones into the re-ordered OFDM blocks of data at both ends of a frequency band in a frequency domain; and transmitting the OFDM blocks.

* * * * *